Figure 1:
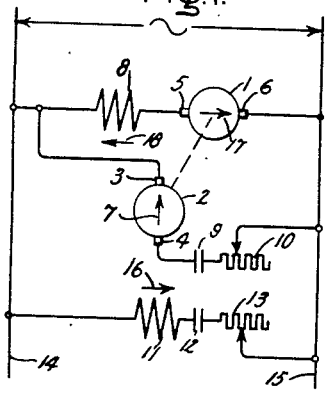

Nov. 1, 1949     F. W. MERRILL     2,486,861
DYNAMOELECTRIC MACHINE
Filed Nov. 14, 1947

Inventor:
Frank W. Merrill,
by Purcell S. Mack
His Attorney.

Patented Nov. 1, 1949

2,486,861

UNITED STATES PATENT OFFICE 2,486,861

DYNAMOELECTRIC MACHINE

Frank W. Merrill, Fort Wayne, Ind., assignor to General Electric Company, a corporation of New York Application November 14, 1947, Serial No. 785,847

20 Claims. (Cl. 322—92)

This invention relates to commutating type dynamoelectric machines of the type in which the armature reaction of the machine provides a major source of excitation.

A dynamoelectric machine of the armature reaction excited variety normally comprises a rotor or armature having a winding and a commutator of the type used on conventional direct-current machines. The major component of excitation in this type of machine is provided by the armature reaction flux produced by current flowing in the armature winding. To facilitate the production of this armature reaction, a plurality of mutually displaced brush sets are provided, at least one set being connected to a low resistance circuit, amounting essentially to a short-circuit. Another set of brushes is connected to a load circuit when the machine is used as a generator or to a power supply circuit when used as a motor.

The stationary member of such a machine is arranged to provide a path of low reluctance for the various magnetic fluxes set up by the armature currents, and is provided with various windings to improve or control the operation of the machine. These stator windings include an exciting or control winding for inducing the voltage in the quadrature rotor circuit, which produces the heavy flow of current in the low resistance path provided, which in turn produces the desired main field heavy armature reaction flux. In the most effective construction, a compensating winding is provided to neutralize substantially the armature reaction attributable to the current flowing to the load when the machine is used as a generator or from the power source when it is used as a motor. With such an arrangement, this type of dynamoelectric machine, used as a direct current excited generator, can be made by appropriate design of the various circuits to provide a variable voltage or variable current output with rapid response to adjustment of the control field excitation and a very high amplification ratio between the change in output and the change in input to the control field. When this type of machine is used as a direct current driven motor, the control field gives exceptionally accurate control of speed with low energy input and the machine is thus adaptable for use with simple low energy speed regulation systems. A dynamoelectric machine of the type described is generally referred to as an "amplidyne," the term referring to an armature reaction excited dynamoelectric machine having a control field winding, a low resistance quadrature circuit brush path, and a compensating winding for neutralizing the secondary armature reaction.

This invention is an improvement of the invention described and claimed in application Serial No. 785,846, of William A. Pringle, filed November 14, 1947, now Patent No. 2,483,151, patented September 27, 1949, and assigned to the assignee of this application. The above referred to application describes means for operating an amplidyne motor from a source of alternating current; or for causing an amplidyne generator to generate alternating current, when excited by alternating current; by the provision of appropriately selected means for tuning the inductive windings of the machine. By tuning the control and quadrature circuits of a machine, otherwise primarily usable as a direct current excited armature reaction type generator with direct current output, it is possible to operate the machine as an alternating current generator from alternating current excitation source. When thus excited, the frequency of such a machine is dependent solely upon the frequency of the exciting agency, which may be a very low energy source such as a vacuum tube oscillator, tuning fork, etc., and is independent of the number of poles and the speed of the machine. Accordingly, low energy alternating current can be greatly amplified without change of the original frequency and the alternating current output can be regulated or controlled by suitable low energy means using one or more control fields.

Another important result of the application of the tuning principle to amplidyne type machines is the provision of an alternating current motor which can be run at an off-synchronous speed. The speed of such a machine does not depend on the number of poles and the frequency of the power source, but depends primarily on the voltage applied, the amount of quadrature (main field) flux, load, windings, and temperature. Moreover, because of the high amplification inherent in an amplidyne motor, a very low energy speed regulating device can be used.

An object of this invention is to provide an improved, alternating current operated dynamoelectric machine of the armature reaction excited type.

Another object of this invention is to provide an improved alternating current dynamoelectric machine of the armature reaction excited type having a self-excited component of excitation cooperating with the quadrature axis generated voltage.

A further object of this invention is to provide an improved variable speed alternating current motor of the armature reaction excited type.

A still further object of this invention is to provide an improved alternating current armature reaction excited generator.

Further objects and advantages of this invention will become apparent and this invention will be better understood from the following description referring to the accompanying drawings, and the features of novelty which characterize this invention will be pointed out with particularity in the claims annexed to and forming a part of this specification.

I have conceived that it would be desirable to provide an alternating current armature reaction excited machine with a strong self-excited shunt field which will cooperate with the quadrature axis generated voltage obtained from the control field flux. Such an arrangement would increase the stability of operation of the machine and permit the use of minimum energy excitation for the control fields.

Since an amplidyne type dynamoelectric machine is provided with a low resistance connection amounting to a short circuit across the primary i. e., quadrature brushes, the application of a conventional shunt field to such a machine is not practical when the machine is operated on alternating current. This is due to the fact that the short-circuited quadrature circuit acts as a transformer secondary, with the shunt field as a primary, and thus the voltage generated in the short-circuited armature by this transformer action is several times the voltage generated by the control field flux. This transformer voltage overrides and destroys the generated voltage in the quadrature circuit thus obliterating the amplidyne characteristics of the machine.

A feature of the present invention is the provision of a component of quadrature excitation responsive to the direct axis voltage or control field circuit voltage of the machine. This component of quadrature excitation is made to produce the major portion of the quadrature armature reaction flux and by means of this self-exciting arrangement, analogous to a self excited shunt field, a very low ampere turn separately excited control field energized from a low energy external frequency source can establish the output frequency of an alternating current amplidyne generator. Furthermore, when applied to an alternating current amplidyne motor, the weak control field can be utilized with a suitable low energy regulatory device to provide speed control within a desired range. In both cases, the weak control field supplies a component of excitation equivalent to the residual excitation of a conventional direct current machine while the major component of excitation is provided by the self-exciting connection. As will appear more fully in the following description, the application of tuning means in connection with the quadrature and control field circuits comprises an important aspect of this invention.

Figure 2:
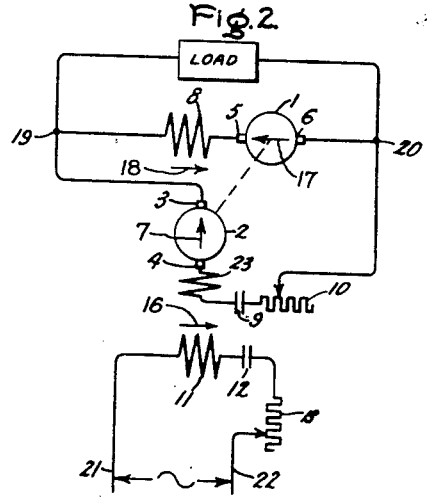
Figure 3:
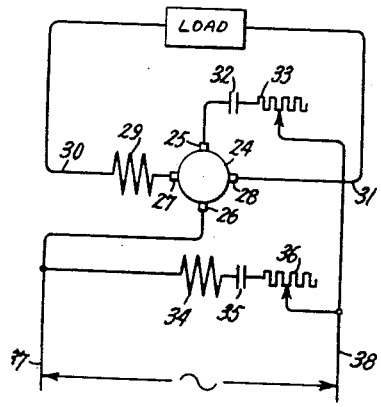
Figure 4:
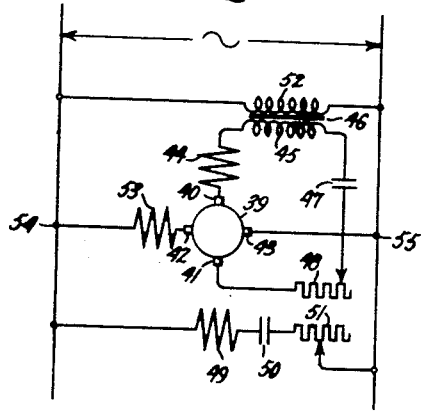
Figure 5:
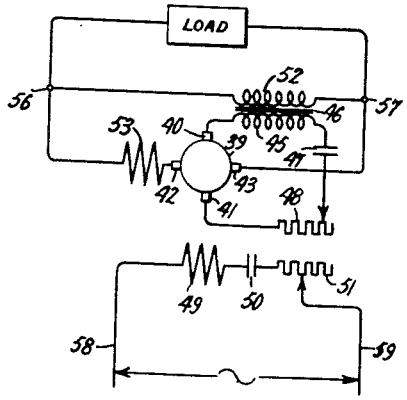

In the drawing, Figs 1 and 4 illustrate embodiments of this invention applied to an amplidyne-type motor and Figs. 2, 3 and 5 illustrate further embodiments applied to alternating current amplidyne-type generators.

Referring now to Fig. 1, there is shown an embodiment of this invention applied to an alternating current amplidyne motor. A conventional amplidyne-type dynamoelectric machine is provided with a short-circuited connection between the quadrature brushes so that the maximum current flow in the quadrature circuit which provides the quadrature armature reaction excitation flux is produced by a minimum excitation of the control field. As explained above, the provision of a conventional shunt field in an alternating current armature reaction excited machine is not practical due to the transformer action between the shunt field and the quadrature circuit of the rotor. It is also impractical to attempt to provide a self-excited machine by feeding back directly the direct axis current into the quadrature circuit since there will be a direct short-circuit between one of the quadrature brushes and one of the direct axis brushes. However, these limiting factors are avoided in the construction now to be described.

Here, the machine is provided with double rotor windings, indicated schematically as separate rotors 1 and 2, although actually only a single rotatable armature structure is employed. These rotor windings are connected with separate commutators on the single armature and are respectively provided with quadrature brushes 3 and 4 and direct axis brushes 5 and 6, the two brush sets being relatively displaced by 90 electrical degrees so that a primary or quadrature circuit is formed through rotor winding 2 and a secondary or direct axis circuit through rotor winding 1. In this diagrammatic presentation, the stationary member with its various pole pieces is not shown.

Compensating field 8 is connected in series with the direct axis brushes 5 and 6 and serves to neutralize substantially the armature reaction produced by current flowing in the direct axis circuit. The quadrature circuit includes quadrature armature winding 2, tuning capacitor 9 which substantially neutralizes the inductive effect of the quadrature armature winding, and variable resistor 10 for varying the current flow in the circuit. Control field 11 provides a weak controlling excitation flux and capacitor 12 is provided to neutralize substantially the inductive effect of the control field. Variable resistor 13 serves to adjust the excitation voltage applied to the control field 11. The control field, quadrature and direct axis circuits are all connected across an alternating current power source 14 and 15.

The inclusion of tuning capacitors 9 and 12 permits the operation of this machine from an alternating current power source. As described in the aforesaid application Serial No. 785,846, it is well-known that a series direct current motor will run in the same direction if the polarity of the voltage applied is reversed. This result is due to the simultaneous reversal of field flux and armature current causing torque to be maintained in the same direction. For this reason, such a motor will operate on an alternating current supply. Moreover, a direct current generator will generate a voltage of reversed polarity when the polarity of the field is reversed. This fact indicates that it is possible to operate an amplidyne-type motor on alternating current, or to provide an amplidyne-type generator which will produce alternating current, when the control field is excited by alternating current, if the inductive effect of the various windings can in some way be neutralized. Capacitors 9 and 12, therefore, serve to effect substantial neutralization of the inductive effects of the control and quadrature circuits, thereby permitting the operation of the machine on alternating current.

In this embodiment, current from the lines 14 and 15 will flow through the quadrature circuit comprising armature winding 2, tuning capacitor 9 and variable resistor 10, which current will be relatively large since the inherent impedance of this circuit is low. This large flow of current through the quadrature armature winding 2 between the quadrature brushes 3 and 4 produces a magnetic flux or primary armature reaction along the primary axis as indicated by the arrow 7, all arrows being shown representing the instantaneous conditions for a given polarity or half cycle of the alternating current source. The control field 11 produces a flux which is cut by armature winding 2 generating a voltage between brushes 3 and 4. This voltage produces an additional current flow between brushes 3 and 4 since a return path is provided through the power source. Thus the total armature reaction flux is the sum of the fluxes produced by the current flowing from the line 14—15 through the armature winding 2 and the current flow due to the generated voltage produced by the control field 11.

The combined armature reaction flux produced in the quadrature armature winding 2 co-acts with the current flowing through the direct axis circuit, comprising compensating field 8 and armature winding 1, to produce the output motor torque. The generated voltage across the quadrature brushes 3 and 4 produced by the control field 11 may be arranged to either buck or boost the voltage across line 14 and 15 so that the total armature reaction flux will be either the sum or the difference of the fluxes produced by the two voltages.

It will now be seen that the greatest percentage of armature reaction required to operate the motor will be provided by the self-exciting connection of the quadrature brushes 3 and 4 across the line 14 and 15. Thus, the excitation required to be supplied by control field 11 in order to provide speed control within a relatively small range is greatly reduced, and the motor speed desired can be set approximately by variable resistance 10 which controls the primary current flow through the quadrature armature winding 2 and accurate control is provided within narrow limits by variable resistance 13. If the control field 11 is connected so that the generated voltage across brushes 3 and 4 boosts the line voltage 14—15, the speed reduction is obtained by decreasing the value of resistance 13. Conversely, if the control field is connected so that the generated voltage bucks the line voltage, the speed is reduced by increasing the value of 13. Since the major portion of the armature reaction excitation is secured by virtue of the self-exciting connection of the quadrature armature winding 2, and therefore the excitation required of control field 11 for speed control within narrow limits is very small, a low energy speed regulating device such as a contact regulator can be substituted for the resistor 13. Such an arrangement is illustrated in Fig. 10 of the above referred to application Serial No. 785,846.

In order to produce a voltage across quadrature brushes 3 and 4 and thus control the speed characteristics of the machine, field exciting winding 11 provides a component of magnetic excitation along the secondary commutating axis of the machine in the direction shown by arrow 16. The current flowing from line 14—15 through the direct axis circuit between direct axis brushes 5 and 6 through armature winding 1 produces a secondary armature reaction along the axis of the brushes 5 and 6 as indicated by the arrow 17. In a motor, the secondary armature reaction and the excitation of control field 11 are cumulative. However, since the secondary armature reaction is very great, compared to the ampere turns of the control field, it must be neutralized if sensitive control is to be obtained by manipulation of rheostat 13. To accomplish this end, field exciting winding 8 is arranged to provide a component of magnetic excitation along the secondary commutating axis of the machine in opposition to the secondary armature reaction 17 as indicated by the arrow 18. The excitation provided by this field exciting winding is arranged to neutralize substantially the magnetic back coupling of electric current in the direct axis circuit of the armature with the quadrature armature current by substantially neutralizing the armature reaction flux along the secondary axis.

By virtue of the self-excited connection of the quadrature circuit which provides the major component of quadrature armature reaction and the provision of compensating field 8 which neutralizes the secondary armature reaction, the control field 11 is only required to supply an extremely low excitation and can, therefore, be made of low energy input, thereby reducing its inductance, which provides rapid speed of response and sensitivity of control within the limits required for speed regulation.

In Fig. 2, there is shown the double wound armature construction of Fig. 1 applied to an alternating current amplidyne generator. Here, the quadrature winding 2, quadrature brushes 3 and 4, quadrature field winding 23, tuning capacitor 9, and variable resistor 10 are connected across the load terminals 19 and 20 of the direct axis circuit which includes direct axis armature winding 1, direct axis brushes 5 and 6, and compensating field 8. Control field 11 is tuned by capacitor 12 and variable resistor 13 serves to control the exciting voltage applied to the control field. The control field circuit is energized by a suitable low energy master frequency source such as a signal generator or tuning fork connected at 21 and 22.

With this arrangement, the major portion of the current in the quadrature armature circuit which produces the quadrature armature reaction is provided by the output voltage generated across the direct axis brushes 5 and 6. Therefore, since the quadrature circuit is self-excited from the direct axis circuit output voltage at 19 and 20, the alternating current exciting input required to control field 11 is greatly reduced. Since the voltage impressed on the quadrature armature circuit from the direct axis circuit is the same frequency as the initial excitation provided by control field 11, the low energy excitation of the control field determines the output frequency of the entire machine.

Starting at rest, control field 11 provides an alternating current residual flux along the secondary commutating axis of the machine, as shown by the arrow 16 which induces a voltage between quadrature brushes 3 and 4 when cut by the quadrature armature winding 2. Since there is a return circuit through lines 19—20 and the load, there will be a resultant flow of current between brushes 3 and 4. This quadrature armature current produces a magnetic flux or quadrature armature reaction, as shown by the arrow 7, which is in turn cut by the direct axis armature windings which generate a voltage between direct axis brushes 5 and 6. As explained above, this output voltage is impressed across brushes 3 and 4 producing a greater current flow with a resultant increase in primary armature reaction and output voltage.

Compensating field 8 serves to neutralize substantially the secondary armature reaction, as shown by the arrow 17, produced by load current flowing in the direct axis circuit through the direct axis armature winding 1 and thus permits the excitation required of control field 11 to be even further reduced. In a generator, the secondary armature reaction and the control field flux are in opposition. A quadrature field winding 23 is shown here which may be of relatively few turns and hence of low reactance, and is provided to improve the distribution of the quadrature armature reaction flux and also to reduce the value of current in the quadrature circuit. The armature reaction flux produced by current flowing through the quadrature armature winding 2 from the direct axis output voltage at terminals 19 and 20 and the current flow as a result of the action of control field 11 has a triangular distribution. The field flux distribution of the quadrature field winding is substantially rectangular and thus, the resultant superposition of the rectangular flux produced by the quadrature field 23 on the triangular armature reaction flux, approximates a more uniform field; and also reduces the current which must be carried by the quadrature brushes 3 and 4 for a given field strength, because the ampere turns added by the field 23 bring about a reduction of total field current.

In this embodiment, the approximate output voltage can be obtained by rough adjustment of variable resistor 10 and then more accurately controlled by resistor 13. Due to the exceptionally low energy excitation required of control field 11 by virtue of the self-excited connection of quadrature armature winding 2, a low energy voltage regulator of the type disclosed in U. S. Patent No. 1,860,556 to J. H. Sole, can be substituted for variable resistor 13.

In order to produce an alternating current amyplidyne generator with a single wound rotor, the embodiment of Fig. 3 is provided. Here, the major portion of the quadrature current which produces the quadrature armature reaction may be obtained from the excitation source. In this embodiment, armature 24 is provided with quadrature brushes 25 and 26 and direct axis brushes 27 and 28. The direct axis output circuit includes compensating field 29 in series with the direct axis brushes 27 and 28 and is connected to the load at terminals 30 and 31. The quadrature circuit is tuned by capacitor 32 and variable resistor 33 is provided to adjust the flow of quadrature armature current. The control circuit includes control field 34, tuning capacitor 35 and variable resistance 36 for adjusting the excitation voltage applied to the control field.

The quadrature armature circuit and the control field circuits are connected in parallel to a master frequency excitation source at terminals 37 and 38. Due to the inherently low reactance of the quadrature armature circuit through brushes 25 and 26, armature 24, capacitor 32, and resistor 33, a relatively large amount of current will flow through the quadrature armature circuit due to the voltage across terminals 37—38. This current flow produces the quadrature armature reaction flux which is cut by the armature turns under the direct axis brushes 27 and 28 inducing the direct axis output voltage across these brushes. Compensating field 29 provides a component of excitation in opposition to the armature reaction flux produced by current flowing in the armature between the direct axis brushes.

It will now be apparent that the major percentage of the quadrature armature current, which produces the quadrature armature reaction, may be supplied directly from the excitation source. However, due to the generating action of the quadrature armature circuit, a small additional component of excitation is provided which can be utilized to accurately control the output voltage within narrow limits. The influx produced by control field 34 generates a voltage across quadrature brushes 25 and 26, and, since there is a closed circuit through the excitation source, this voltage will produce an additional current flow through the quadrature windings producing additional quadrature armature reaction. The voltage generated across the quadrature brushes 25 and 26 by the action of control field 34 can be arranged to buck or boost the excitation provided by the connection of the quadrature brushes to the line 37—38. This arrangement permits the approximate adjustment of the output voltage by variable resistor 33, and accurate automatic regulation of the output voltage for varying load, temperature, speed, etc. by a suitable low energy regulating means substituted for the resistor 36, such as the voltage regulator of the aforesaid Patent No. 1,860,556.

In Fig. 4, there is shown a preferred embodiment of this invention applied to an alternating current amplidyne motor. In this embodiment, an indirect excitation feature is provided by utilizing an insulating transformer between the line and the quadrature circuit to enable the superposition of power voltage and excitation voltage in a single wound rotor without a short circuit. Here, armature 39 is provided with quadrature brushes 40 and 41 and direct axis brushes 42 and 43. The quadrature circuit includes quadrature field 44, secondary winding 45 of transformer 46, tuning capacitor 47, and variable resistor 48 which is used to control the current flow in the quadrature circuit. Control field 49 is tuned by capacitor 50 and variable resistance 51 is used to control the necessary exciting voltage to the control field. The primary 52 of transformer 46, the direct axis circuit including compensating field 53 in series with direct axis brushes 42 and 43, and the control field circuit are all connected across the alternating current line 54 and 55. This arrangement provides a true shunt excitation for an amplidyne motor and allows shunt starting and shunt and amplidyne running.

In operation, control field 49 provides a component of excitation which produces a generated voltage across quadrature brushes 40 and 41. Due to the inherently low reactance of the quadrature voltage across quadrature winding 44, transformer secondary 45, capacitor 47 and resistor 48, relatively low excitation is required of the control field to produce a large flow of quadrature armature current between brushes 40 and 41. This quadrature armature current produces a quadrature armature reaction flux which co-acts with the current flowing from the line 54—55 through compensating field 53 and the armature windings between direct axis brushes 42 and 43 to produce the motor torque. The voltage across transformer secondary 45, which is responsive to the line voltage, is impressed on the quadrature circuit in series with the generated voltage across brushes 40 and 41 produced by the control field 49. This connection provides a source of shunt excitation from the line in that the major portion of the quadrature armature current is produced by virtue of the voltage across transformer secondary 45 and thus the control excitation required of control field 49 in order to effect accurate speed control over a narrow range can be very small. The voltage generated across quadrature brushes 40 and 41 can be arranged to either buck or boost the voltage of transformer secondary 45. If the generated voltage boosts the transformer voltage, decreasing the resistance of variable resistor 51 will reduce the motor speed while a bucking connection results in an increased motor speed when the resistance of variable resistor 51 is decreased.

Since the predominate portion of the armature reaction flux is produced by current flowing in the quadrature circuit by virtue of the voltage across transformer secondary 45, the speed of the motor can be approximately adjusted by resistor 48 and since exceptionally low exciting energy is required of control field 49, the speed can be accurately regulated within narrow limits by adjustment of variable resistor 51. Resistor 51 can be substituted by a low energy speed regulating device such as shown in Fig. 10 of the above referred to application, Serial No. 785,846.

Referring now to Fig. 5, there is shown the preferred embodiment of Fig. 4 arranged as an alternating current amplidyne generator. In this embodiment, the output voltage of the direct axis circuit is fed back to the quadrature circuit by an insulating transformer to provide a source of self-excitation. Here, armature 39 is provided with quadrature brushes 40 and 41 and direct axis brushes 42 and 43. The direct axis circuit which includes compensating field 53 in series with the direct axis brushes 42 and 43 is connected to the load at terminals 56 and 57. The quadrature circuit includes secondary 45 of insulating transformer 46, tuning capacitor 47 and variable resistance 48 in series with the quadrature brushes 40 and 41. The primary winding 52 of transformer 46 is connected across and parallel with the direct axis output circuit, across load terminals 56 and 57. Control field 49 is excited from a low energy master frequency source from terminals 58 and 59, is tuned by capacitor 50, and has its applied voltage varied by variable resistor 51.

In operation, control field exciting winding 49 provides a low energy alternating current residual component of excitation which induces a voltage in the armature winding across quadrature brushes 40 and 41. By virtue of the low impedance connection across the quadrature brushes through transformer secondary 45, capacitor 47, and resistance 48, the generated quadrature voltage across brushes 40 and 41 will produce a flow of quadrature armature current. This circulating current produces a primary component of quadrature armature reaction flux which is cut by the armature windings under direct axis brushes 42 and 43 inducing the direct axis output voltage between these brushes. The direct axis output voltage is impressed on the quadrature circuit by means of insulating transformer 46 which is connected across the direct axis output circuit. Thus, a voltage responsive to the output voltage is induced, in secondary 45 of transformer 46, in series with the generated voltage across quadrature brushes 40 and 41. The compensating field 53 is provided to neutralize the secondary armature reaction due to the current flowing in the direct axis windings between direct axis brushes 42 and 43. The voltage of the secondary winding 45 of transformer 46 is normally arranged to boost the generated voltage across the quadrature brushes 40 and 41 in the same manner that the generated voltage of a self excited D. C. generator will build up in the direction of the residual voltage when the field and armature connections and rotation are correct.

It will now be apparent that the major percentage of quadrature armature current which produces the quadrature armature reaction may be provided from the voltage across the secondary winding 45 of transformer 46 and, therefore, an extremely low energy source can be utilized to excite control field 49 and to establish the output frequency of the machine. Variable resistor 48 is adjusted so that the greater part of the quadrature armature current is drawn from the shunt exciting transformer 46 and in this case the control field 49 acts as an alternating current residual field, the variable resistor 51 being used to control the output voltage for variations of load, speed, temperature, etc. the expenditure of input energy from lines 58 and 59 being small because of the amplification inherent in this amplidyne arrangement of the fields.

In a machine incorporating the arrangement of Fig. 5, it was found that by using a transformer with a 3 to 1 turn ratio and a 300 mf. condenser in the quadrature circuit, a small amplidyne generator at 3600 R. P. M. produced 75 watts at 60 cycles with a control field input of .28 watt. The machine used in this test was especially useful for operation as an alternating current amplidyne generator because of its thin rotor and stator laminations, both sets of laminations being of .010" iron. With these thin punchings, an effective resistance was obtained, on 60 cycles, of only approximately four times the direct current resistance. The stator punchings of this generator were $5\frac{5}{16}$" outside diameter and 3.27" inside diameter. The rotor was 3.25" outside diameter, giving an .010" single airgap, and both rotor and stator were stacked to $1\frac{7}{8}$". Because of the thin laminations, operation of this machine was possible up to 400 cycles. The rotor was provided with 24 slots and had 48 coils of $4\frac{1}{2}$ turns per coil of .0453" wire with 2 coils per slot. The resistance of the armature winding between diametrically opposite points was .27 ohm at 25° C. The commutator was connected so as to bring the neutral, i. e., the point of maximum generated voltage of the rotor, but of lowest generated voltage between the commutator bars, on the center line of the direct axis.

The stator windings were arranged as shown in Fig. 10 of the aforesaid application Serial No. 785,846. The control field winding 49 consisted of two coils, one on each pole connected in series, with 1000 turns per coil of .010" wire. The total direct current resistance of the control field winding was 300 ohms. The compensating field winding 53 had concentric coils, all in series, with 16 turns around the middle tooth, 12 turns around three teeth, 13 turns around five teeth, and 14 turns around seven teeth, the continuous winding being of .0571" wire.

The commutator of this machine was $1\frac{1}{2}$" diameter with all four brushes $\frac{3}{32}$" thick, each brush spanning only one rotor coil. The capacitor for tuning the control field at 60 cycles was .37 mf.

Figs. 1 through 5 illustrate tuning capacitors arranged in both the quadrature and control field circuits. The aforementioned application Serial No. 785,846 discloses the progressive tuning of an alternating current amplidyne machine whereby such a machine would operate satisfactorily from 5 to 20 cycles with control field tuning only, from 20–200 cycles with tuning in the quadrature and control field circuits and over 200 cycles with tuning in all circuits. On one machine of fractional horsepower size, it was found that at 60 cycles the control field could be tuned with a capacitor of the order of .40 mf. but that a capacitor of 450 mf. was needed to tune the quadrature circuit. In tuning the various circuits, it was found that the resonance curves were not sharp but that extreme saturation of the magnetic circuit should be avoided, and preferably kept below 50%. It was also found that the load on a tuned alternating current amplidyne generator had little effect on the tuning and, therefore, the same values of tuning capacitors were applicable throughout the load range of the machine.

An amplidyne machine with tuned circuits as described in the aforesaid application Serial No. 785,846, when used as a generator will generate alternating current of a frequency independent of speed and, due to the inherent amplification characteristics of this type of machine, excitation applied to the control field can be of relatively low power. When utilized as a motor, the speed may be governed exclusively by the excitation provided by the control field and since the time constant in an amplidyne motor is inherently very low, the speed of such a motor can be varied rapidly over a wide range.

This invention provides for the utilization of the direct axis output voltage of an amplidyne generator, or the alternating current power source of an amplidyne motor to produce the major portion of the armature reaction, analogous to shunt excitation of a direct current machine, thereby permitting a great reduction in the supplementary excitation required from the control field and permitting the use of extremely low energy means in connection with the control field for accurately controlling the motor speed or the generator output voltage.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine of the armature reaction excited type having a stationary member and a rotatable member, a set of primary brushes and a set of secondary brushes electrically displaced from said primary brush set adapted to provide a primary and a secondary circuit respectively through said rotatable member, a circuit including field exciting means for generating a voltage in said primary circuit, means for introducing capacitive reactance in one of said circuits for substantially neutralizing the inductive reactance thereof, and means for impressing a second voltage on said primary circuit.

2. A dynamoelectric machine of the armature reaction excited type having a stationary member and a rotatable member, a set of primary brushes and a set of secondary brushes electrically displaced from said primary brush set adapted to provide a primary and a secondary circuit respectively through said rotatable member, a circuit including field exciting means for generating a voltage in said primary circuit, means for introducing capacitive reactance in one of said circuits for substantially neutralizing the inductive reactance thereof, and means for impressing the voltage across one of said secondary and said field exciting circuits on said primary circuit.

3. A dynamoelectric machine of the armature reaction excited type having a stationary member and a rotatable member, a set of primary brushes and a set of secondary brushes electrically displaced from said primary brush set adapted to provide a primary and a secondary circuit respectively through said rotatable member, a circuit including field exciting means for generating a voltage in said primary circuit, means for introducing capacitive reactance in one of said circuits for substantially neutralizing the inductive reactance thereof, and means for impressing the voltage across said field exciting circuit on said primary circuit.

4. A dynamoelectric machine of the armature reaction excited type having a stationary member and a rotatable member, a set of primary brushes and a set of secondary brushes electrically displaced from said primary brush set adapted to provide a primary and a secondary circuit respectively through said rotatable member, a circuit including field exciting means for generating a voltage in said primary circuit, means for introducing capacitive reactance in one of said circuits for substantially neutralizing the inductive reactance thereof, and means for impressing the voltage across said secondary circuit on said primary circuit.

5. A dynamoelectric machine of the armature reaction excited type having a stationary member and a rotatable member, a commutator on said rotatable member connected to a winding and having a set of primary brushes for providing a primary circuit through said rotatable member, another commutator on said rotatable member connected to another winding and having a set of secondary brushes for providing a secondary circuit through said rotatable member, said windings being electrically insulated from each other, said primary brush sets being electrically displaced from said secondary brush set, a circuit including a field exciting winding for generating a voltage in said primary circuit, said last named circuit including a capacitor for substantially neutralizing the inductive reactance thereof, and means for impressing the voltage across said field exciting circuit on said primary circuit, said primary circuit including a capacitor for neutralizing the inductive effect thereof.

6. A dynamoelectric machine of the armature reaction excited type having a stationary member and a rotatable member, a commutator on said rotatable member having a set of primary brushes for providing a primary circuit through said rotatable member, another commutator on said rotatable member having a set of secondary brushes for providing a secondary circuit through said rotatable member, said primary brush set being electrically displaced from said secondary brush set, a circuit including a field exciting winding for generating a voltage in said primary circuit, said last named circuit including a capacitor for substantially neutralizing the inductive reactance thereof and means for impressing the voltage across said secondary circuit on said primary circuit, said primary circuit including a capacitor for substantially neutralizing the inductive effect thereof.

7. A motor of the armature reaction excited type having a stationary member and a rotatable member and terminals for connection to a source of alternating current power, a commutator on said rotatable member having a set of primary brushes for providing a primary circuit through said rotatable member, another commutator on said rotatable member having a set of secondary brushes for providing a secondary circuit through said rotatable member, said primary brush set being electrically displaced from said secondary brush set, and a circuit including a field exciting winding for generating a voltage in said primary circuit and having a capacitor for substantially neutralizing the inductive reactance of said field exciting circuit, said secondary circuit having a second field exciting winding for neutralizing the armature reaction produced by current in said secondary circuit, each of said circuits being connected across said alternating current terminals, said primary circuit including a capacitor for substantially neutralizing the inductive effect thereof.

8. An alternating current generator of the armature reaction excited type adapted for connection to a load and including, a stationary member and a rotatable member, a commutator on said rotatable member having a set of primary brushes for providing a primary circuit through said rotatable member, another commutator on said rotatable member having a set of secondary brushes for providing a secondary circuit through said rotatable member, said primary brush set being electrically displaced from said secondary brush set, and a circuit including a field exciting winding adapted to be excited by alternating current for generating a voltage in said primary circuit and having a capacitor for substantially neutralizing the inductive reactance of said field exciting winding, said secondary circuit having a second field exciting winding for neutralizing the armature reaction produced by current in said secondary circuit, said primary and said secondary circuits being connected to said load, said primary circuit including a capacitor for substantially neutralizing the inductive reactance thereof.

9. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit through said rotatable member, a circuit including a field exciting winding for generating a voltage in said primary circuit, capacitive reactance means in one of said circuits for substantially neutralizing the inductive reactance thereof, and means for impressing the voltage across one of said circuits on said primary circuit.

10. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit through said rotatable member, a circuit including a field exciting winding for generating a voltage in said primary circuit, capacitive reactance means in one of said circuits for substantially neutralizing the inductive reactance thereof, and means for impressing the voltage across said field exciting circuit on said primary circuit.

11. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit through said rotatable member, a circuit including a field exciting winding for generating a voltage in said primary circuit, capacitive reactance means in one of said circuits for substantially neutralizing the inductive reactance thereof, and means for impressing the voltage across said secondary circuit on said primary circuit.

12. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit through said rotatable member, a circuit including a field exciting winding for generating a voltage in said primary circuit, a second field exciting winding for substantially neutralizing the armature reaction produced by current in said secondary circuit, capacitive reactance means in said field exciting and primary circuits for substantially neutralizing the inductive reactance therein, and means for impressing the voltage across said field exciting circuit on said primary circuit.

13. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit through said rotatable member, a circuit including a field exciting winding for generating a voltage in said primary circuit, a second field exciting winding for substantially neutralizing the armature reaction produced by current in said secondary circuit, capacitive reactance means in said field exciting and primary circuits for substantially neutralizing the inductive reactance therein, and means for impressing the voltage across said secondary circuit on said primary circuit.

14. A motor of the armature reaction excited type having a stationary member and a rotatable member and terminals for connection to a source of alternating current power, a commutator on said rotatable member having a set of primary brushes and a set of secondary brushes electrically displaced from said primary brush set adapted to provide a primary and a secondary circuit through said rotatable member, a circuit including a field exciting winding for generating a voltage in said primary circuit and having a capacitor for neutralizing the inductive reactance of said field exciting circuit field exciting winding, and a second field exciting winding for substantially neutralizing the armature reaction produced by current in said secondary circuit, each of said circuits being connected across said alternating current terminals, said primary circuit including a capacitor for substantially neutralizing the inductive reactance thereof.

15. An alternating current generator of the armature reaction type adapted for connection to a load and including, a stationary member and a rotatable member provided with a commutator, a set of primary brushes and a set of secondary brushes electrically displaced from said primary brush set adapted to provide a primary and a secondary circuit through said rotatable member, a circuit including a field exciting winding adapted to be excited by alternating current for generating a voltage in said primary circuit and having a capacitor for substantially neutralizing the inductive reactance thereof, and a second field exciting winding for substantially neutralizing the armature reaction produced by current in said secondary circuit, said secondary circuit being connected to said load, said primary circuit being connected to said field exciting circuit and including a capacitor for substantially neutralizing the inductive reactance of said primary circuit.

16. A dynamoelectric machine of the armature reaction excited type having a stationary member and a rotatable member provided with a commutator, a set of primary brushes, and a set of secondary brushes electrically displaced from said primary brush set adapted to provide a primary and a secondary circuit through said rotatable member, a circuit including a field exciting winding for generating a voltage in said primary circuit, capacitive reactance means in one of said circuits for substantially neutralizing the inductive reactance thereof, and means associated with said secondary circuit and said primary circuit for impressing a voltage responsive to the voltage across said secondary circuit on said primary circuit.

17. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit through said rotatable member, a circuit including a field exciting winding for generating a voltage in said primary circuit, capacitive reactance means in one of said circuits for substantially neutralizing the inductive reactance thereof, and transformer means associated with said secondary circuit and said primary circuit for impressing a voltage responsive to the voltage across said secondary circuit on said primary circuit.

18. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit through said rotatable member, a circuit including a field exciting winding for generating a voltage in said primary circuit, a second field exciting winding for substantially neutralizing the armature reaction produced by current in said secondary circuit, capacitive reactance means in said field exciting and primary circuits for substantially neutralizing the inductive reactance therein, and transformer means associated with said secondary circuit and said primary circuit for impressing a voltage responsive to the voltage across said secondary circuit on said primary circuit.

19. A motor of the armature reaction excited type having a stationary member and a rotatable member and terminals for connection to a source of alternating current power, a commutator on said rotatable member having a set of primary brushes and a set of secondary brushes electrically displaced from said primary brush set adapted to provide a primary and a secondary circuit through said rotatable member, a circuit including a field exciting winding for generating a voltage in said primary circuit and having a capacitor for substantially neutralizing the inductive reactance of said field exciting circuit, a second field exciting winding for substantially neutralizing the armature reaction produced by current in said secondary circuit, said field exciting and said secondary circuits being connected across said alternating current terminals, said primary circuit including a capacitor for substantially neutralizing the inductive reactance thereof, and transformer means having one winding connected across said secondary circuit and another winding in said primary circuit for impressing a voltage responsive to the voltage across said secondary circuit on said primary circuit.

20. An alternating current generator of the armature reaction excited type adapted for connection to a load and including a stationary member and a rotatable member provided with a commutator, a set of primary brushes and a set of secondary brushes electrically displaced from said primary brush set adapted to provide a primary and a secondary circuit through said rotatable member, a circuit including a field exciting winding adapted to be excited by alternating current for reactance a voltage in said primary circuit and having a capacitor for substantially neutralizing the inductive reactance thereof, a second field exciting winding for substantially neutralizing the armature reaction produced by current in said secondary circuit, said secondary circuit being connected to said load, said primary circuit including a capacitor for substantially neutralizing the inductive reactance thereof, and transformer means having one winding connected across said secondary circuit and another winding in said primary circuit for impressing a voltage responsive to the voltage across said secondary circuit on said primary circuit.

FRANK W. MERRILL.

REFERENCES CITED

The following references are of record in the file of this patent:

FOREIGN PATENTS

| Number | Country | Date |
| --- | --- | --- |
| 2,677 | Great Britain | 1907 |

Certificate of Correction

Patent No. 2,486,861                                                November 1, 1949

FRANK W. MERRILL

It is hereby certified that errors appear in the printed specification of the above numbered patent requiring correction as follows:

Column 8, line 2, for "influx" read *flux*; line 50, strike out the words "voltage across" and insert instead *circuit through*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*